(12) United States Patent
Suzuki

(10) Patent No.: US 6,470,356 B1
(45) Date of Patent: Oct. 22, 2002

(54) MULTIMEDIA INFORMATION AUDIOVISUAL APPARATUS

(75) Inventor: Nobuo Suzuki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/385,031

(22) Filed: Aug. 30, 1999

(30) Foreign Application Priority Data

Sep. 18, 1998 (JP) .......................................... 10-264827

(51) Int. Cl.⁷ ............................................... G06F 17/30
(52) U.S. Cl. ..................................... 707/104.1; 707/100
(58) Field of Search ............................ 707/104.1, 100

(56) References Cited

U.S. PATENT DOCUMENTS

| | | | | |
|---|---|---|---|---|
| 5,745,454 A | * | 4/1998 | Yokota | 369/47.21 |
| 5,819,286 A | * | 10/1998 | Yang et al. | 707/104.1 |
| 5,960,152 A | * | 9/1999 | Sawabe et al. | 386/98 |
| 5,963,909 A | * | 10/1999 | Warren et al. | 705/1 |
| 5,966,121 A | * | 10/1999 | Hubbell et al. | 345/726 |

FOREIGN PATENT DOCUMENTS

| | | |
|---|---|---|
| JP | A-5-189431 | 7/1993 |
| JP | A-8-235209 | 9/1996 |

OTHER PUBLICATIONS

Nakamura et al., High Density Recording for Magneto–Optical disk Drive, Mar. 1998, Magnetics IEEE Transactions on, vol. 34 issue 2, pp. 411–413.*

* cited by examiner

Primary Examiner—Greta Robinson
(74) Attorney, Agent, or Firm—Oliff & Berridge, PLC (57) ABSTRACT

A multimedia information audiovisual apparatus which can suitably add mark information to streaming media and manage it and enables a user to see and listen to a presentation effectively. The multimedia information audiovisual apparatus comprises a media information management unit which manages media information including streaming media having a time axis, a reproduction scenario management unit which manages scenario information describing a combination in time and space of the media information for executing a presentation, a visual information reproduction unit which reproduces visual media information included in the media information, a sound information reproduction unit which reproduces sound media information included in the media information, and a scenario interpretation unit which reads the media information from the media information management unit based on the scenario information and causes the visual information reproduction unit or the sound information reproduction unit to reproduce the media information, wherein the apparatus further comprises a marking information management unit which manages marking information for relating the media information described in the scenario information, mark information related to the media information and a time duration in a presentation during which the mark information is related to the media information.

10 Claims, 7 Drawing Sheets

FIG. 2

```
        HEADER PORTION
        w1      (x1a,y1a)−(x1b,y1b)
200a {  w2      (x2a,y2a)−(x2b,y2b)
        w3      (x3a,y3a)−(x3b,y3b)

~200c    ~200d       ~200e       ~200f
        TIME    WIN NO.     MEDIA       DURATION t0      2           FACE1       (840s)
                3           SLIDE1      120s
200b {              AUDIO       VOICE       ∞ t1      1           MOVIE1      (120s)
                3           SLIDE2      110s t2      3           SLIDE3      124s
        ⋮       ⋮           ⋮           ⋮
```

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | ★ | ★ | ★ | ★ | 0 | 0 | 0 | 0 | 0 |
| 0 | 0 | 0 | 0 | 0 | 0 | 0 | 0 | 0 | 0 | 0 | ◎ | ◎ | 0 |
| 0 | 0 | 0 | 0 | 0 | 0 | 0 | 0 | 0 | 0 | 0 | 0 | 0 | 0 |

MULTIMEDIA INFORMATION AUDIOVISUAL APPARATUS

BACKGROUND OF THE INVENTION

1. Field of the Invention

The present invention relates to a multimedia information audiovisual apparatus which enables a user to see and listen to a presentation composed of media information including document media such as still pictures and texts and streaming media such as sounds, dynamic pictures, animations and graphics.

2. Related Art

Heretofore, there has been proposed a system for marking, writing personal memos on or annotating a digital document like writing memos on or marking a printed document for feed-back to an author. In the future, such a technology for assisting editing work on digital documents will be becoming very important in such a scene that cooperation is carried out over a network along with the further expansion of a network and the popularization of multimedia documents.

A system capable of annotating a document consisting of pages such as a presentation using a so-called OHP is disclosed by Japanese Published Unexamined Patent Application No. Hei 5-189431. The system disclosed by this publication is able to annotate document media which do not include streaming media such as texts, figures and images without impairing the security of an original document. In this system, an annotation is written in a layer different from that of a document, thereby eliminating editing work on the original document. This is a technology which is made possible with digital documents.

A method for retrieving a point in a multimedia document is disclosed by Japanese Published Unexamined Patent Application No. Hei 8-235209. This publication teaches a method for specifying a certain point on the time axis of streaming media (time axis media) in order to retrieve a desired scene from multimedia information consisting of a plurality of media.

As described above, prior art technologies for specifying a certain point (in space or time) of a presentation and adding a "marker" or other information relate to document media mainly composed of pages. As for streaming media having a time axis, there exists only a technology for specifying a certain "point" on the time axis for the purpose of retrieval and there is not disclosed a technology for adding a "marker" to a certain range of streaming media.

A network conference which is carried out asynchronously for relatively long time (for example, several days or more) is taken into consideration.

When a user understands what happened while he/she was away from the network conference, he/she accesses the hysteresis of the conference and reads it, tracing the sequence of speeches made by other members. Since most of such network conferences are currently carried out using only text data, it is not so difficult to understand the progress of a conference by tracing the time sequence and reference link.

However, in the near future, network conferences will be carried out using multimedia and the opinions of speakers and materials are expected to be stored as multimedia information. Further, a conference system is expected to take multimedia minutes on a real-time basis. When a user who already saw and listened to such multimedia minutes is to see and listen to multimedia minutes which were updated after that, such a problem is conceivable that efficiency is extremely low because he/she has to see the same scene many times if he/she does not know which part was updated (not read) and which part he/she saw (read).

In the prior art, an unread part or read part of a presentation (media mixed presentation) a plurality of media of which are reproduced on multiple windows at the same time cannot be specified fully. That is, in the prior art, one point on the single time axis of a streaming medium can be specified. When mark information indicating a read part or unread part is added to the media mixed presentation, such contents as "from where to where (on the time axis)" and "which part of the presentation or which medium contents" are omitted.

In recent years, various general-purpose methods for processing digital documents have been proposed but a method for managing mark information to be added to streaming media or the like is yet to be reported.

SUMMARY OF THE INVENTION

It is an object of the present invention to provide a multimedia information audiovisual apparatus which can suitably add mark information to streaming media forming a presentation and manage the mark information. It is another object of the present invention to provide a multimedia information audiovisual apparatus which enables a user to see and listen to a presentation effectively.

The above objects of the present invention are attained by a multimedia information audiovisual apparatus comprising a media information management part which manages media information including streaming media having a time axis, a reproduction scenario management part which manages scenario information describing a combination in time and space of the media information for executing a presentation, a visual information reproduction part which reproduces visual media information included in the media information, a sound information reproduction part which reproduces sound media information included in the media information, and a scenario interpretation part which reads the media information from the media information management part based on the scenario information and causes the visual information reproduction part or the sound information reproduction part to reproduce the media information, wherein the apparatus further comprises a marking information management part which manages marking information for relating the media information described in the scenario information, mark information related to the media information and a time duration in a presentation during which the mark information is related to the media information.

BRIEF DESCRIPTION OF THE ACCOMPANYING DRAWINGS

These and other objects and advantages of the present invention will become clear from the following description with reference to the accompanying drawings, wherein.

DESCRIPTION OF THE PREFERRED EMBODIMENTS

A multimedia information audiovisual apparatus according to an embodiment of the present invention will be described with reference to FIGS. 1 to 13. The whole configuration of the multimedia information audiovisual apparatus according to this embodiment will be first described with reference to FIG. 1. This multimedia information audiovisual apparatus presents multimedia information by combining multiple media information in time and space and reproducing them.

Figure 1:
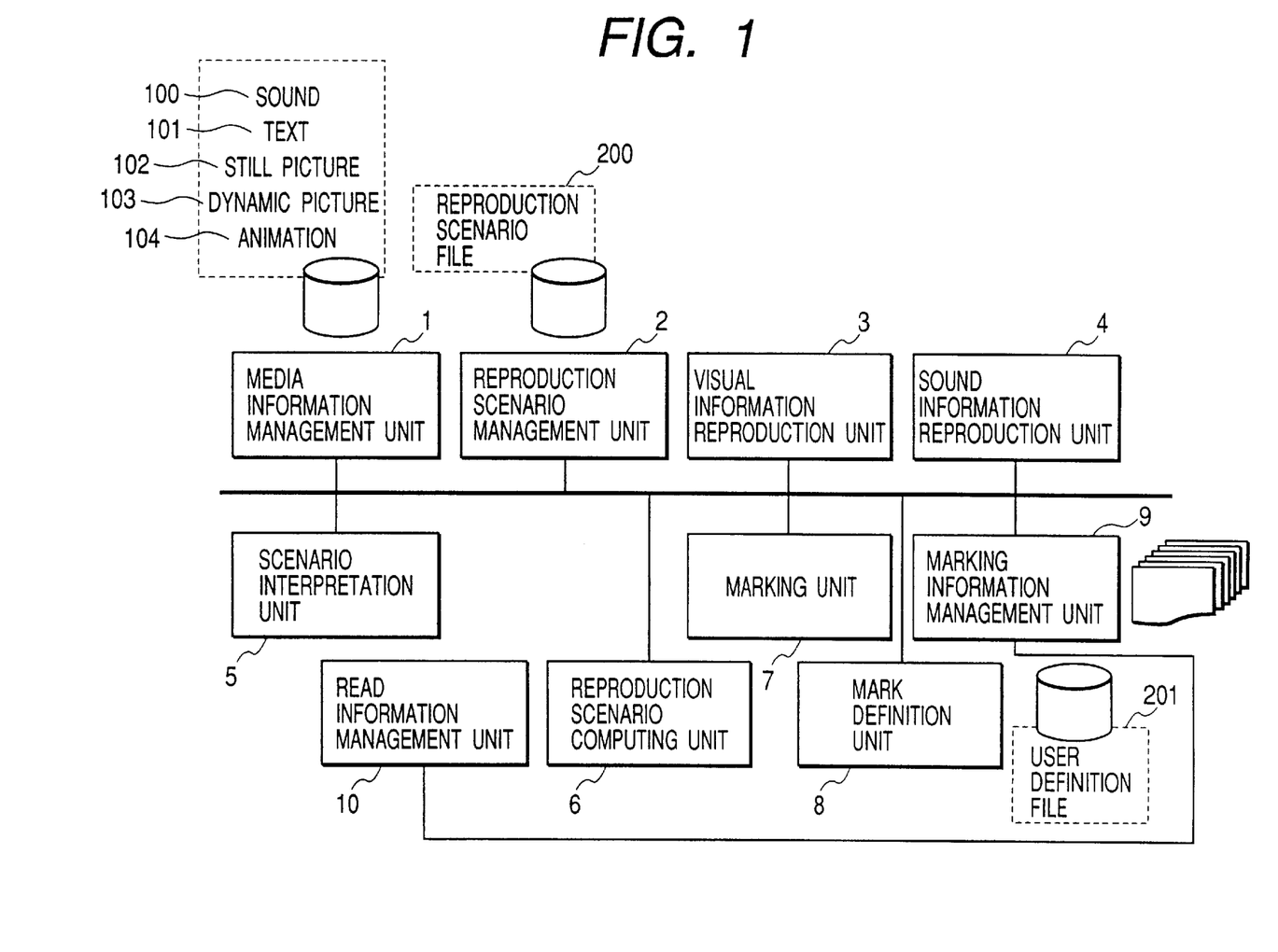
FIG. 1 is a diagram showing the whole configuration of a multimedia information audiovisual apparatus according to an embodiment of the present invention.

A media information management unit 1 stores media contents such as sounds 100, texts 101, still pictures 102, dynamic pictures 103 and animations 104 as independent media.

A reproduction scenario management unit 2 stores a reproduction scenario file 200 describing a media time sequence and spatial layout for reproducing each medium of the presentation. An example of the reproduction scenario file 200 will be described with reference to FIG. 2. The reproduction scenario file 200 roughly consists of a header portion 200a and a body portion 200b.

The header portion 200a describes the layout of windows (three in FIG. 2) used in the presentation which is executed based on the reproduction scenario file 200.

Figure 2:
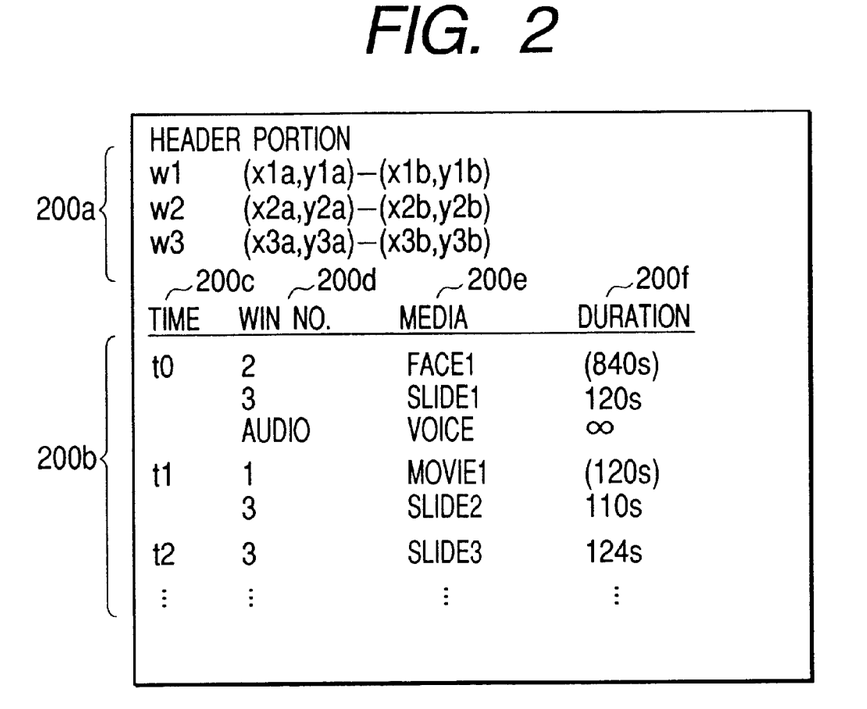
FIG. 2 is a diagram showing an example of reproduction scenario file according to an embodiment of the present invention.

The body portion 200a describes which content (medium) is reproduced at which timing. Stated more specifically, the body portion 200a has an execution start time 200c, a window number 200d, a medium 200e and a reproduction time duration 200f.

A time for starting the reproduction of a medium is set in the execution start time 200c. A window number for reproducing a medium is set in the window number 200d when the medium to be reproduced is an image medium and "audio" is set in the window number 200d when the medium to be reproduced is a sound medium. The ID name of a medium to be reproduced is set in the medium 200e. In the reproduction time length 200f, in the case of a medium having no time axis such as a still picture, a time duration for displaying the medium is described. It is not necessary to describe anything in the reproduction time duration 200f when a streaming medium having a time axis such as dynamic picture/animation is reproduced at a normal speed. However, it is necessary to describe a total reproduction time when a medium is reproduced at a speed different from a normal speed, such as reproduction at a speed two times higher than the normal speed or a low speed.

When the reproduction scenario file 200 describes two or more media in the media 200e at the same execution start time, two or more media can be reproduced at the same time.

Figure 3:
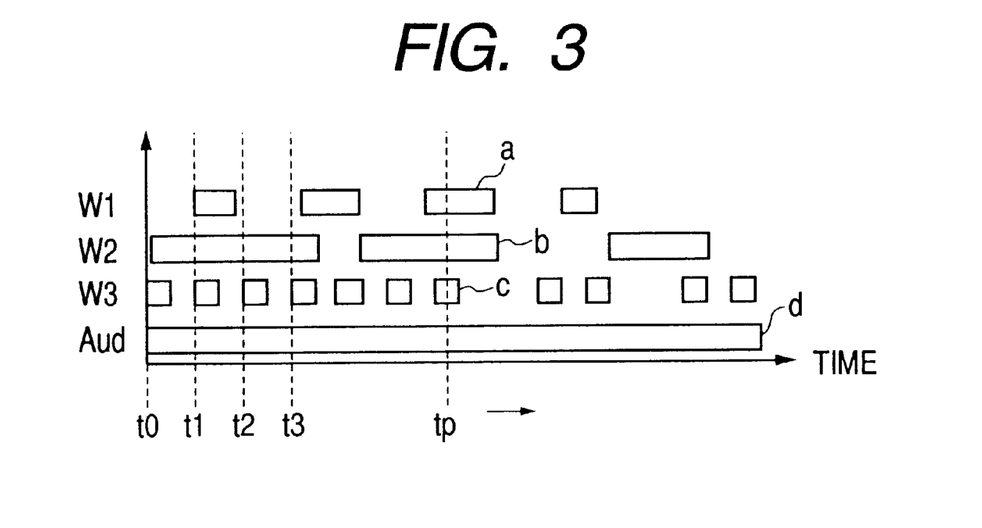
FIG. 3 is a diagram showing the scores of a presentation according to an embodiment of the present invention.
Figure 4:
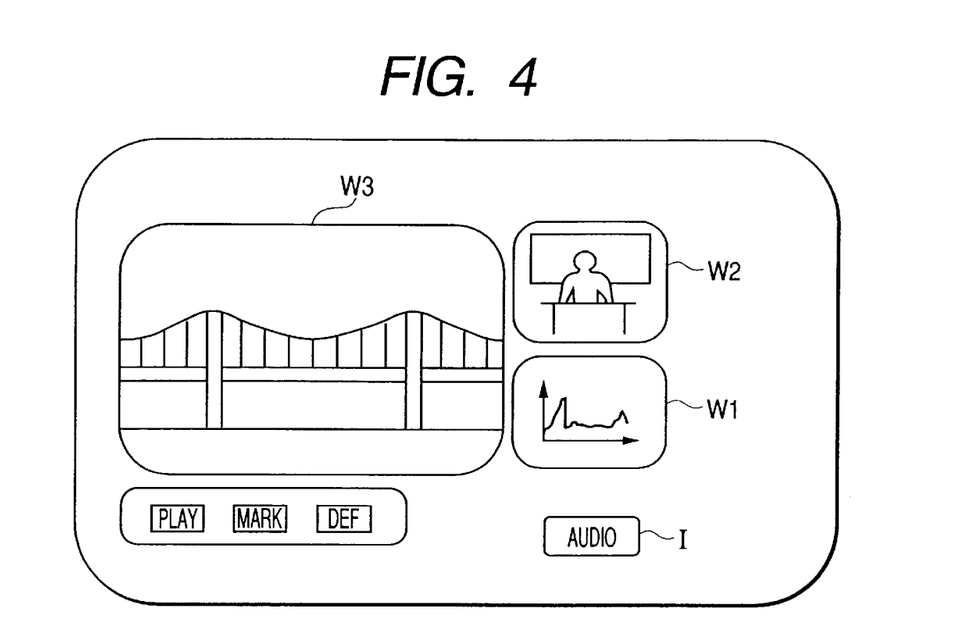
FIG. 4 is a diagram showing a display example of multimedia presentation according to an embodiment of the present invention.

The concept of a reproduction schedule (score) of a multimedia presentation based on the reproduction scenario file shown in FIG. 2 will be described hereinunder with reference to FIG. 3 and FIG. 4. In FIG. 3, time is plotted on the axis of abscissas, space (window number or audio) for reproduction is plotted on the axis of ordinates, and each rectangle represents each medium. FIG. 4 shows a multimedia presentation at a time t=tp.

It is understood from FIG. 3 and FIG. 4 that, at a time t=tp, a medium "a" is reproduced on a window W1, a medium "b" is reproduced on a window W2, a medium "c" is reproduced on a window W3 and a medium "d" is reproduced by audio equipment.

A description is subsequently given of the basic multimedia reproduction operation of this multimedia information audiovisual apparatus with reference to FIG. 5. This operation is started when a user presses a button "PLAY" for reproducing a presentation.

First, the scenario interpretation unit 5 reads the corresponding presentation reproduction scenario 200 from the reproduction scenario management unit 2 (step SI). Then, the scenario interpretation unit 5 reads the header portion 200a of the reproduction scenario 200 and acquires information on the layout of windows (step S2).

Thereafter, the scenario interpretation unit 5 reads from the top of the body portion 200a, reads a medium to be reproduced at a predetermined execution start time from the medium information management unit 1 (step S3) and detects whether the retrieved medium is a sound medium or not (step S4). When it is detected that the medium is not a sound medium but a visual medium, that is, a text 101, still picture 102, dynamic picture 103 or animation 104, the medium is output to the visual information reproduction unit 4 together with window layout information for reproducing the medium. The visual information reproduction unit 4 creates a window based on the input window layout information and reproduces the input medium on the window (step S5).

When the medium read from the media information management unit 1 is a sound medium 100, the medium is output to the sound information reproduction unit 4. The sound information reproduction unit 4 reproduces sounds from a speaker based on the input medium (step S6).

The above processes (steps S3 to S6) are executed based on the description of the body portion 200a.

Figure 6:
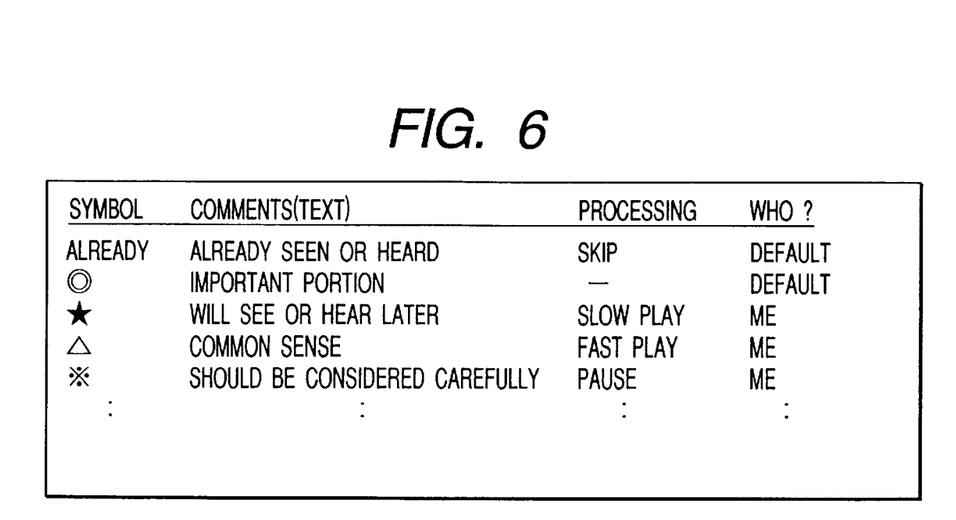
FIG. 6 is a diagram showing a user definition file according to an embodiment of the present invention.

A description is subsequently given of media mark information contained in a presentation with reference to FIG. 6. FIG. 6 shows an example where mark information prepared as default and mark information defined by the user are contained in a single file (user definition file 201).

The user definition file 201 is stored in the mark definition unit 8. Each mark information contained in the user definition file 201 contains symbols (including sound information) representing each mark information perceptively, comments showing the contents of each mark information, link information on related information (for example, URL), processing methods for mark information (processing script), persons who defined the mark information and the like.

In the user definition file shown in FIG. 6, there is defined mark information which is set by default, indicates that it is already seen or listened to and is symbolized by "already" and by which a skip will be made. There are also defined mark information which is set by default, indicates that it is important and is symbolized by ⊙, mark information which is set by a user (me), indicates that it should be reproduced later and is symbolized by ★ and by which it will be reproduced slowly, mark information which is set by a user, indicates that it is common information and is symbolized by Δ and by which it will be reproduced fast. There are further defined mark information which is set by a user, indicates that it should be considered carefully and is symbolized by ✖ and by which a pause will be made, and the like. Mark information can be defined by a user using the mark definition unit 8. Thereby, the user can prepare his/her own presentation by customizing or personalizing a presentation as required and can see and listen to it.

It is recommended to define general mark information in advance. For example, when mark information indicative of importance (symbol ⊙) is defined and added to an important medium that the author of a presentation wants to be seen, the symbol ⊙ can be displayed for the medium having the mark information at the time of reproducing the medium of the presentation and a receiver can pay attention to the medium. Time can be saved by reproducing only a medium having the mark information.

A description is then given of the operation of adding mark information to a medium included in a presentation.

When a user wants to add mark information to a specific medium while the presentation is executed, the marking unit 7 is used to specify a desired medium of the presentation reproduced by the visual information reproduction unit 4 to add mark information by means of the marking information management unit 9 as will be described hereinafter. Mark information can be added to an audio medium by specifying the icon (icon I in FIG. 4) of an audio medium in a presentation window. Mark information to be added can be selected from a plurality of marks registered in the mark definition unit 8 by the marking unit 7 and a plurality of different mark information can be added to the same medium at the same time.

For example, to add mark information symbolized by ★, the symbol ★ of the mark information is selected using the marking unit 7 and the mouse of the marking unit 7 is clicked while the symbol is moved to and located on a desired medium, thereby adding the mark information (symbol ★) to the medium at its time. To add mark information to a desired medium for a desired time duration, the mouse of the marking unit 7 is clicked down for the desired time duration.

To add a plurality of contents to the same medium at the same time, a plurality of mark information are added, or another definition is added to mark information which has already been added. To add a plurality of mark information, a presentation is rewound and reproduced and other mark information is added. To add another definition to mark information which has already been added, a plurality of definitions are given to the mark information by the mark definition unit B. Mark information which has been already added can be redefined by the mark definition unit 8 so that the meaning of the mark information can be changed. For example, if the definition of processing is deleted when the defined processing is not necessary any more, the processing is not made on a portion having mark information for the processing. This cut labor and time required for changing the added mark information one by one.

Figure 7:
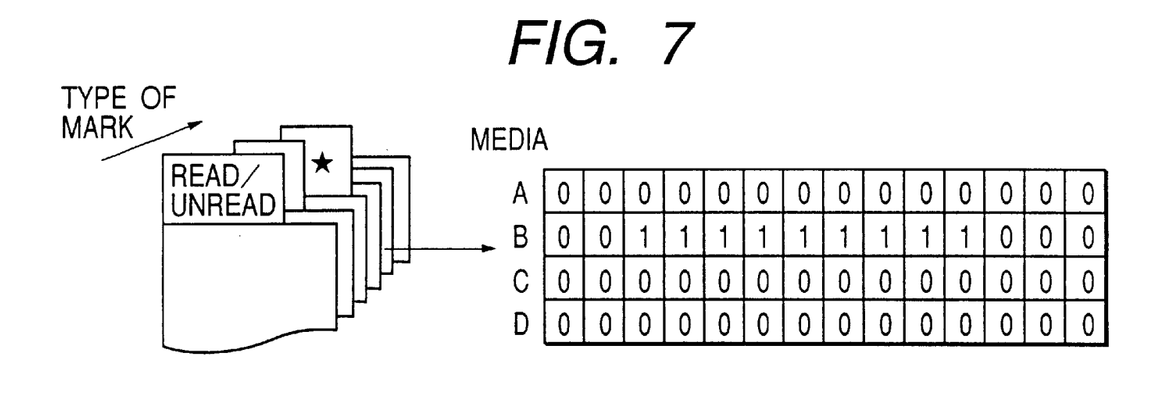
FIG. 7 is a diagram showing a marking information file according to an embodiment of the present invention.

An example of a marking information file for adding mark information to a medium at a predetermined time and managing it will be described hereunder with reference to FIG. 7. In this embodiment, a marking information file which consists of two-dimensional maps is used to make comprehensible the relationship between the marking information file and the reproduction scenario of a presentation.

The marking information file has layers corresponding to the number of mark information and each layer stores data on the addition of mark information. Each layer is a two-dimensional map plotting time on the axis of abscissas and media on the axis of ordinates. The sampling interval of the time of the axis of abscissas is any interval (for example, 1 second). In FIG. 7, each layer has 1-bit information having a time duration of 1 second for each medium. In the initial state, all the bits of the layer are "0".

A description is subsequently given of the operation of adding mark information.

The marking information management unit 9 sets the bits of the corresponding medium and time to "1" based on an instruction from the marking unit 7. For example, supposing that a user specifies the mark ★ for a time duration of from 2 to 10 seconds for a medium B by means of the marking unit 7, bits 2 to 10 of the line of the medium B of the layer of the mark information corresponding to the mark ★ are all set to "1" as shown in FIG. 7.

Thus, computation can be carried out with ease by managing mark information to carry out processing defined by mark information as will be described hereinafter.

The operation of adding mark information (unread and read mark information) indicating that the already reproduced media has been read will be described hereunder.

The operation of adding the unread and read mark information to a medium is carried out by starting the reproduction of a presentation while a user turns on the option of putting unread and read marks.

Figure 5:
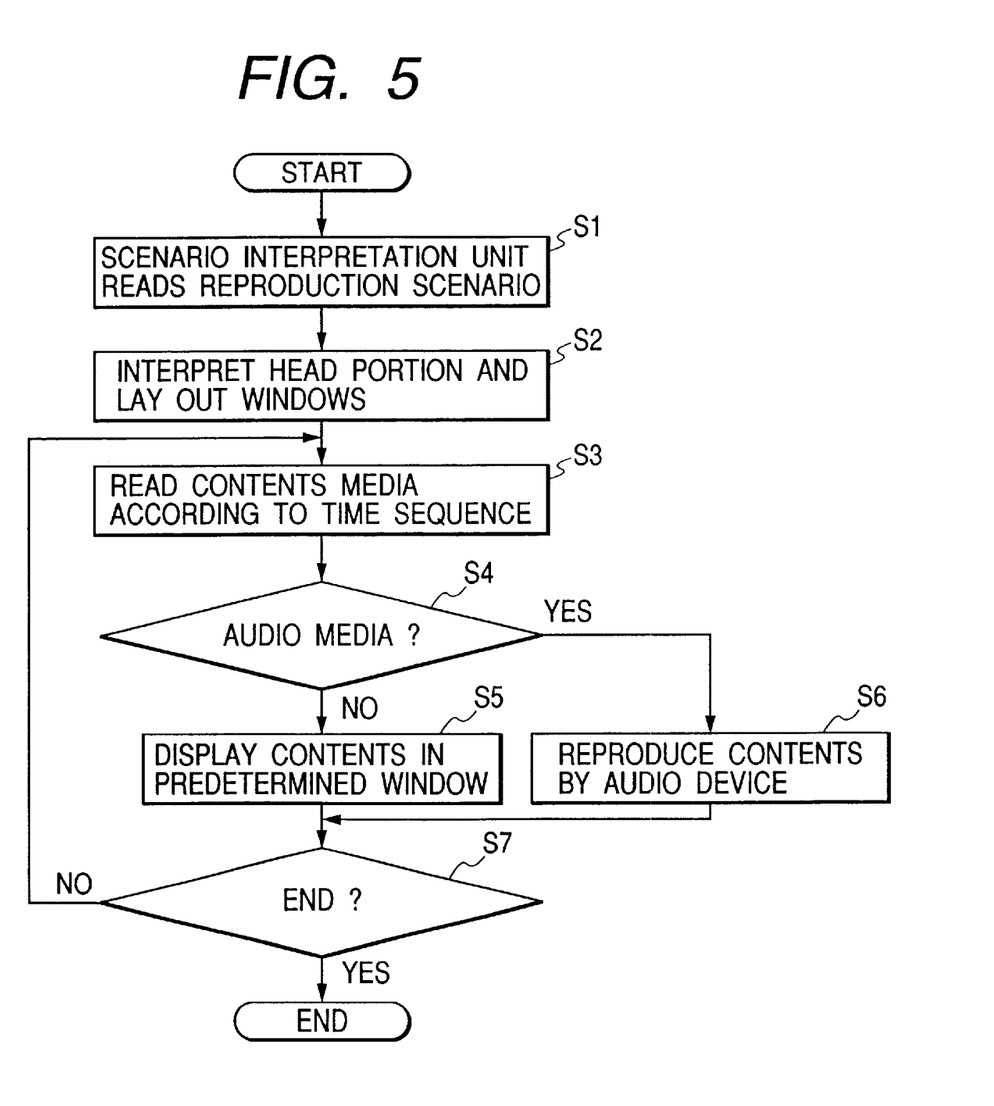
FIG. 5 is a flowchart of basic multimedia reproduction operation according to an embodiment of the present invention.
Figure 8:
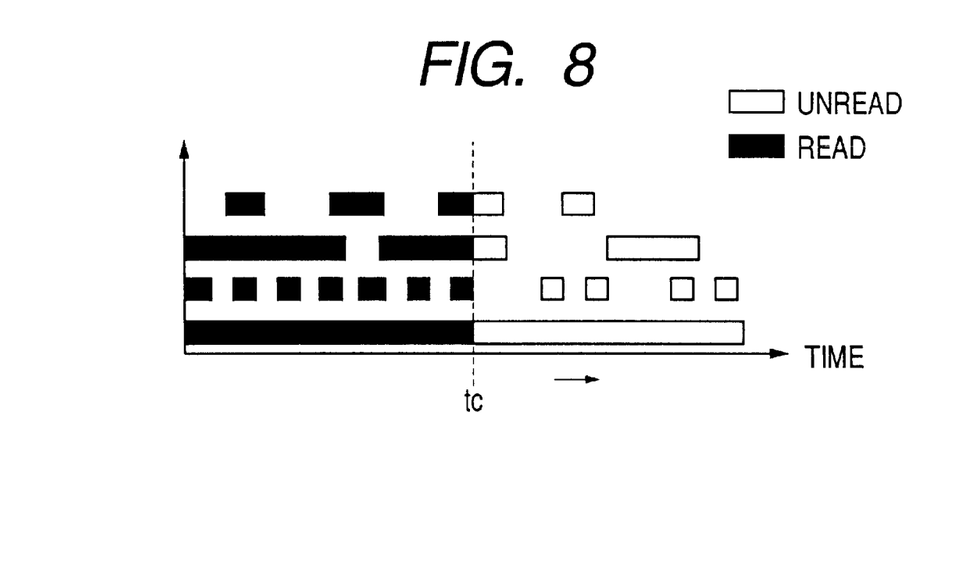
FIG. 8 is a diagram showing scores based on the addition of unread and read mark information according to an embodiment of the present invention.

In this operation, the above-described basic multimedia reproduction operation shown in FIG. 5 is carried out, the scenario interpretation unit 5 reads corresponding media based on a reproduction scenario 200, and the visual information reproduction unit 3 and the sound information reproduction unit 4 reproduce the media. Along with this operation, the read information management unit 10 detects which part of each medium has been reproduced as shown in FIG. 8 and sets bits corresponding to the detected media and time of the layers of the unread and read mark information of the marking information file to "1".

A description is subsequently given of the operation of reproducing a presentation when a user suspends the reproduction of a presentation at a time tc shown in FIG. 8 and gives an instruction to reproduce the subsequent part of the presentation.

When the user instructs the formation of a scenario for only unread portions to the reproduction scenario computing unit 6, the reproduction scenario computing unit 6 reads a marking information file from the marking information management unit 9, interprets the layer of the unread and read mark information and forms a reproduction scenario containing only unread portions.

Stated more specifically, the reproduction scenario computing unit 6 converts the scenario file of the corresponding presentation into scores and obtains a two-dimensional map showing the relationship between each medium and the reproduction time of each medium based on the scores. Thereafter, the layer of unread and read mark information is retrieved from the marking information file. AND of the former and the latter is computed and only read portions are retrieved. Then, the reproduction scenario computing unit 6 retrieves processing (the processing of skipping the reproduction of a medium) contained in the unread and read mark information from the user definition file 201 of the mark defining unit 8, obtains scores for the processing of skipping read portions and reconverts the score into a scenario.

By the above operation, a scenario for skipping the read portions and not other portions, that is, a scenario file for reproducing only unread portions is formed.

When the reproduction of a presentation is carried out using this formed reproduction scenario file as shown in FIG. 5, the presentation is reproduced from a time tc.

Figure 9:
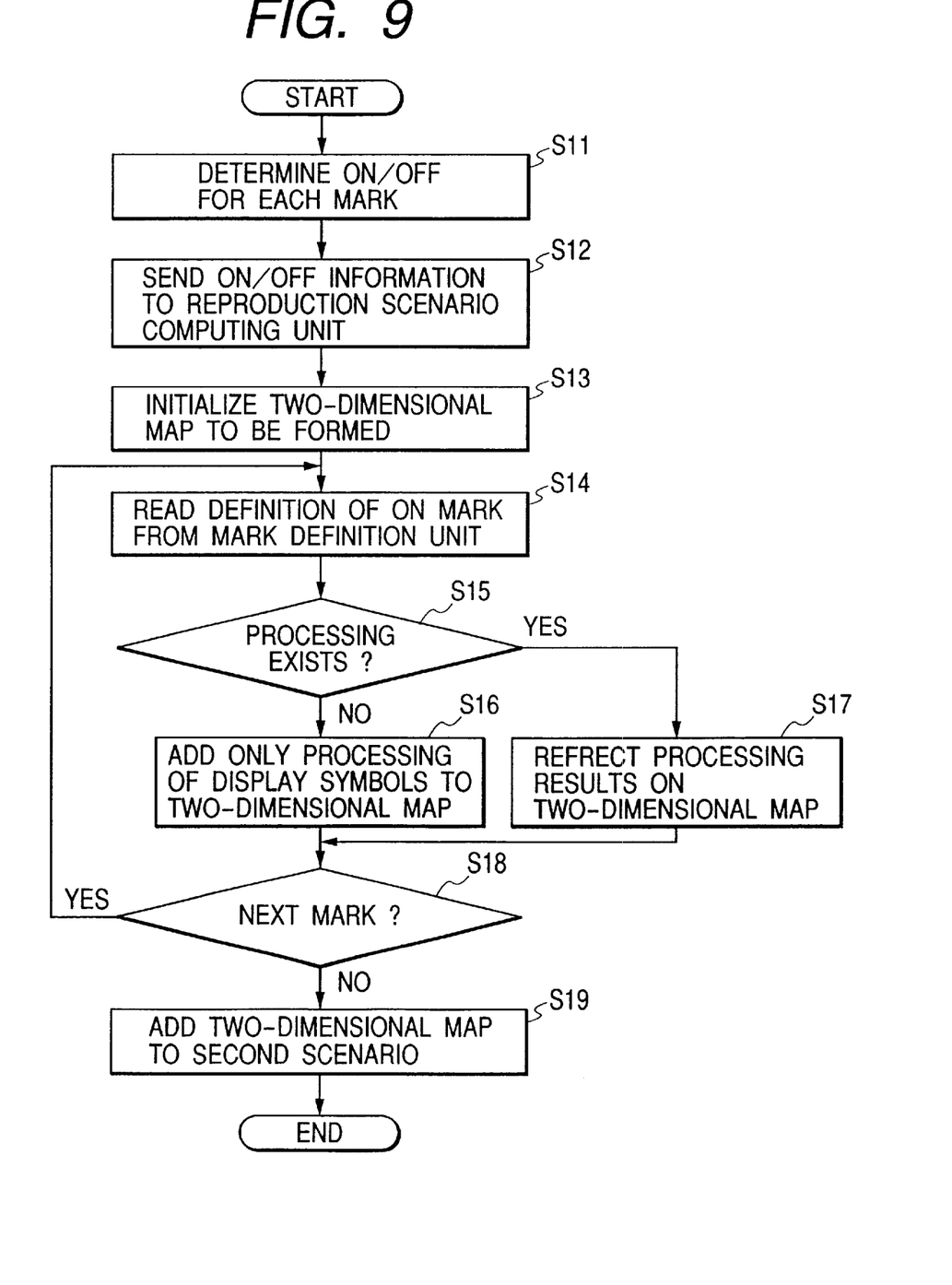
FIG. 9 is a flowchart of the operation of computing a reproduction scenario according to an embodiment of the present invention.

A description is subsequently given of the operation of reproducing a presentation based on the addition of a plurality of mark information with reference to FIG. 9.

Figure 10:
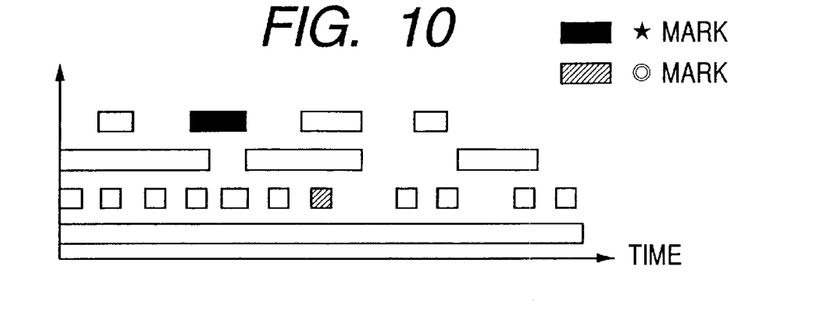
FIG. 10 is a diagram showing that added importance mark information and slow reproduction mark information are superimposed upon the scores of a reproduction scenario file according to an embodiment of the present invention.

The marking information file of the marking information management unit 9 has layers of important mark information (symbol ◎) added by the author and slow reproduction mark information (symbol ★) added by a user for slow reproduction. Each mark information is added as shown in FIG. 10 when it is converted into scores for normal reproduction. Further, the processing of importance mark information is not defined whereas the slow reproduction processing of slow reproduction mark information is defined in the user definition file 201.

When the user instructs the reproduction of a presentation and whether each mark information whose layer is managed by the marking information management unit 9 should be made effective in the reproduction of the presentation (On, Off) is input (step S11), (On, off) for each mark information is sent to the reproduction scenario computing unit 6 (step S12). In this embodiment, slow reproduction mark information and importance mark information are set On.

Thereafter, the reproduction scenario computing unit 6 initializes a two-dimensional map to be formed (step S13), reads mark information which is set On from the user definition file 201 of the mark definition unit 8 (step S14) and detects whether the processing of the mark information is defined or not (step S15). As a result, when the processing is not defined, the reproduction scenario computing unit 6 adds the processing of displaying a symbol at a position of the two-dimensional map corresponding to bits which are set to "1" of the layer (step S16). Thereby, the processing of displaying a symbol at the position of the two-dimensional map corresponding to bits which are set to "1" of the layer of the importance mark information has been added. When the processing is defined, the reproduction scenario computing unit 6 reflects the defined processing on the two-dimensional map (step S17). Thereby, portions corresponding to bits which have been set to "1" of the layer of the slow reproduction mark information are reflected on the two-dimensional map so that they are reproduced by extending the time axis.

Figure 11:
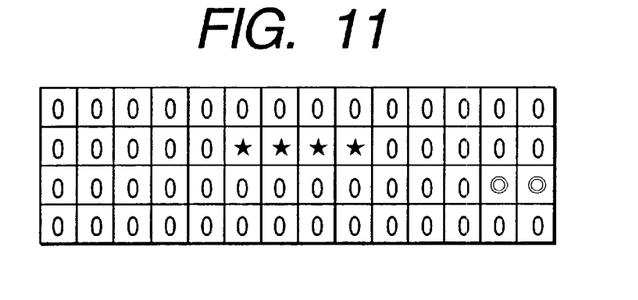
FIG. 11 is a diagram showing a two-dimensional map computed based on added importance mark information and slow reproduction mark information according to an embodiment of the present invention.
Figure 12:
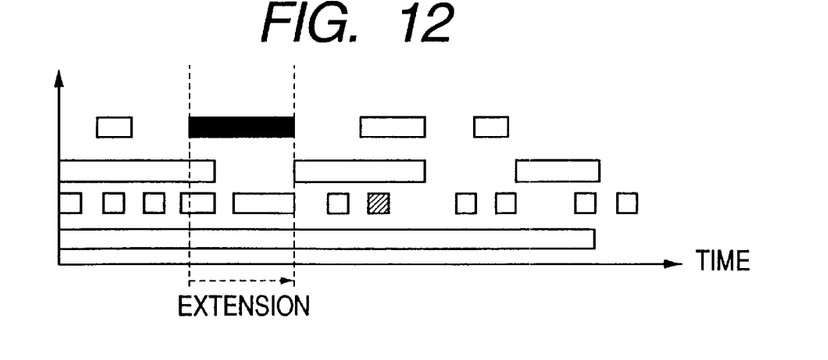
FIG. 12 is a diagram showing scores obtained by computation based on added importance mark information and slow reproduction mark information according to an embodiment of the present invention.

The above steps (steps S14 to S17) are carried out on all mark information which have been set On (step S18). Thereby, a two-dimensional map containing a plurality of mark information added as shown in FIG. 11 is formed. In FIG. 11, ◎ indicates that the processing of displaying a symbol is carried out and ★ indicates that slow reproduction is carried out. Thereafter, the reproduction scenario computing unit 6 creates scores based on the two-dimensional map. That is, the processing of displaying a symbol is carried out at a portion corresponding to ◎ of the two-dimensional map and scores are formed to carry out slow reproduction at a portion corresponding to ★. Thereby, scores as shown in FIG. 12 are created that the time axis having slow reproduction mark information of the scores shown in FIG. 10 is extended. Thereafter, a reproduction scenario file is formed based on the scores created by the reproduction scenario computing unit 6 (step S19). In the reproduction of a portion having importance mark information, a reproduction scenario file is described such that a symbol ◎ is displayed in the window during the reproduction of the portion.

When the scenario interpretation unit 5 executes a presentation based on the above formed reproduction scenario file, slow reproduction is carried out at the portion (time) having slow reproduction mark information and the symbol ◎ is displayed at the portion having importance mark information in the display window of the corresponding medium contained in the presentation.

At this point, the time for displaying the symbol ◎ corresponding to importance mark information is preferably made longer than a time having the importance mark information. Particularly preferably, the symbol is displayed before the time having the importance mark information. This is because the user adds importance mark information by means of the marking unit 7 during the reproduction of a presentation and there is a time gap between the time when the user finds an important portion during reproduction and the time when the user actually adds the importance mark information.

In the above processing, there can be a case where different mark information are added to the same portion of scores and the processes of the mark information cannot be carried out at the same time. In this case, the processing may be carried out based on the priority order of these mark information. For example, it is easy to determine the priority order of mark information by changing the order of computation.

A description is subsequently give of the processing of detecting an unread medium when a new medium is added in a read range of a scenario file.

Figure 13:
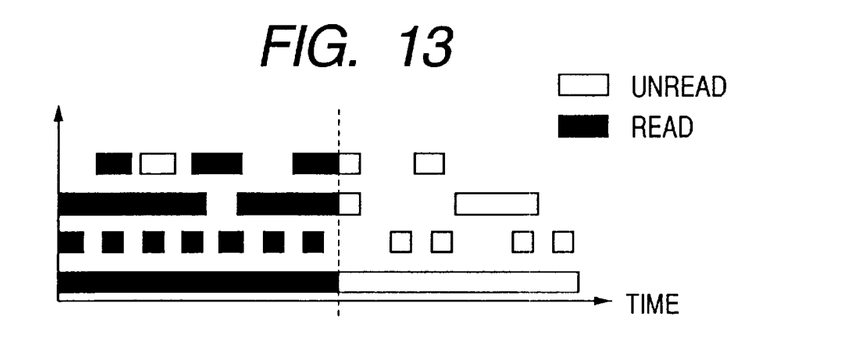
FIG. 13 is a diagram showing that scores obtained based on an updated scenario are superimposed upon scores obtained based on added unread and read mark information.

First, the reproduction scenario computing unit 6 converts a reproduction scenario file into scores, retrieves the layer of unread and read mark information from the making information management unit 9, and forms a two-dimensional map corresponding to the scores based on the layer. Then, the reproduction scenario computing unit 6 masks the two-dimensional map with the unread and read mark information, superimposes the scores of the reproduction scenario upon it and detects unmasked portions. FIG. 13 shows that the two-dimensional map is masked with the unread and read mark information and superimposed by the scores of the reproduction scenario. As shown in FIG. 13, unmarked portions indicate newly added contents or unread contents. In this way, a newly added medium can be easily detected and can be reproduced without fail.

Thus, the user can freely add mark information such as annotation, memo or medium processing to a specific portion of a complex presentation consisting of a plurality of media. Read and unread portions can be managed fully, important portions of a presentation can be easily grasped, and it is possible to efficiently see or listen to the presentation.

According to the present invention, mark information can be suitably added to a streaming medium constituting a presentation and managed, and it is possible to effectively see and listen to the presention.

What is claimed is:

1. A multimedia information audiovisual apparatus, comprising:
   a media information management part that manages media information including streaming media having a time axis;
   a reproduction scenario management part that manages scenario information describing a combination in time and space of said media information for presenting within a space each media executed at a point in time for each point along the time axis;
   a visual information reproduction part that reproduces visual media information included in said media information;
   a sound information reproduction part which reproduces sound media information included in said media information;
   a scenario interpretation part that reads said media information from said media information management part based on said scenario information and causes said visual information reproduction part or said sound information reproduction part to reproduce the media information; and
   a marking information management part that manages marking information for relating said media information described in said scenario information, mark information related to the media information and a time duration in a presentation during which said mark information is related to said media information.

2. The multimedia information audiovisual apparatus according to claim 1, wherein said mark information contains at least one information selected from symbols representing mark information, text information, link information and a processing script.

3. The multimedia information audiovisual apparatus according to claim 2, wherein said mark information contains information indicative of an already reproduced range of said media information, and said marking information management part manages marking information for said mark information, said already reproduced media information and a time duration during which the media information has been reproduced.

4. The multimedia information audiovisual apparatus according to claim 2, wherein said visual information reproduction part or said sound information reproduction part reproduces and displays said symbols contained in said mark information added to the media information for said time duration having the mark information during the reproduction of said media information.

5. The multimedia information audiovisual apparatus according to claim 4, wherein said scenario interpretation part reproduces said symbols for a time duration longer than said time duration having said mark information.

6. The multimedia information audiovisual apparatus according to claim 1, wherein said apparatus further comprises a mark definition part that defines information contained in said marking information management part.

7. The multimedia information audiovisual apparatus according to claim 1, wherein said apparatus further comprises a marking part that specifies a time duration for adding predetermined mark information to said media information being reproduced, and said marking information management part manages said media information, said mark information and said specified time duration as marking information.

8. The multimedia information audiovisual apparatus according to claim 1, wherein said apparatus further comprises a reproduction scenario computing part that reproduces second scenario information based on said mark information, said marking information and said scenario information, and the reproduction scenario interpretation part reproduces media information based on said second scenario information.

9. The multimedia information audiovisual apparatus according to claim 8, wherein said reproduction scenario computing part creates said second scenario information by interpreting and processing a processing script contained in said mark information.

10. The multimedia information audiovisual apparatus according to claim 8, wherein said reproduction scenario computing part detects media based on said mark information, said marking imformation and said scenario information.

* * * * *